United States Patent [19]

Martignoni et al.

[11] 4,157,270

[45] Jun. 5, 1979

[54] HYDROGEN GAS GENERATOR FROM HYDRAZINE/AMMONIA

[75] Inventors: Pasquale Martignoni; William M. Chew; Orval E. Ayers; James A. Murfree, Jr., all of Huntsville, Ala.

[73] Assignee: The United States of America as represented by the Secretary of the Army, Washington, D.C.

[21] Appl. No.: 832,711

[22] Filed: Sep. 12, 1977

[51] Int. Cl.$^2$ ............................. C09K 3/00; C06C 9/00
[52] U.S. Cl. .................................. 149/109.6; 60/211; 60/218; 60/219; 252/374; 252/188; 423/648 R
[58] Field of Search .................. 252/188, 374; 60/211, 60/218, 219; 149/22, 36, 109.6; 423/648 R

[56] References Cited

U.S. PATENT DOCUMENTS

| | | | |
|---|---|---|---|
| 2,774,214 | 12/1956 | Malina et al. | 60/211 |
| 3,147,592 | 9/1964 | Rose | 60/211 |
| 3,165,382 | 1/1965 | Forte | 60/218 |
| 3,710,573 | 1/1973 | Hubbuch et al. | 60/218 |
| 3,730,909 | 5/1973 | Armstrong et al. | 60/218 |
| 3,732,694 | 5/1973 | Blumenthal et al. | 60/218 |
| 3,757,520 | 9/1973 | Murtree et al. | 60/219 |
| 3,875,924 | 4/1975 | Bayles | 60/218 |
| 4,061,512 | 12/1977 | Chew et al. | 149/22 |

OTHER PUBLICATIONS

Martignoni et al., "The Thermal and Catalytic Decomposition of Ammonia and Hydrazine", Report No. Rk--Tr-70-2 (1-1970).

*Primary Examiner*—Edward A. Miller
*Attorney, Agent, or Firm*—Nathan Edelberg; Robert P. Gibson; Jack W. Voigt

[57] ABSTRACT

A catalyst bed containing alumina pellets on which an active catalyst metal selected from iridium, nickel, niobium, and molybdenium has been deposited is employed to decompose a compound selected from deuterohydrazine, deuteroammonia, hydrazine, and ammonia to yield ammonia free deuterium and nitrogen or hydrogen and nitrogen at a temperature required for immediate use in a DF or HF laser which uses F atoms as the fuel. The decomposition temperature of the catalyst bed is maintained by a hypergolic reaction produced from reacting a fuel selected from the group consisting of hydrazine, methylhydrazine, 1,2-dimethylhydrazine, and blends of the same with an oxidizer selected from the group consisting of inhibited red fuming nitric acid, dinitrogen tetroxide, chlorine trifluoride, and chlorine pentafluoride. A laser employing ammonia free decomposition products of hydrazine and ammonia produced at a temperature between about 500° C. and 900° C. operates at a higher power output. When $NH_3$ is present in the $H_2$ and diluent gas, $N_2$, a decrease of 20% in the output is experienced for each 1-2% $NH_3$ up to about 8% concentration.

5 Claims, 1 Drawing Figure

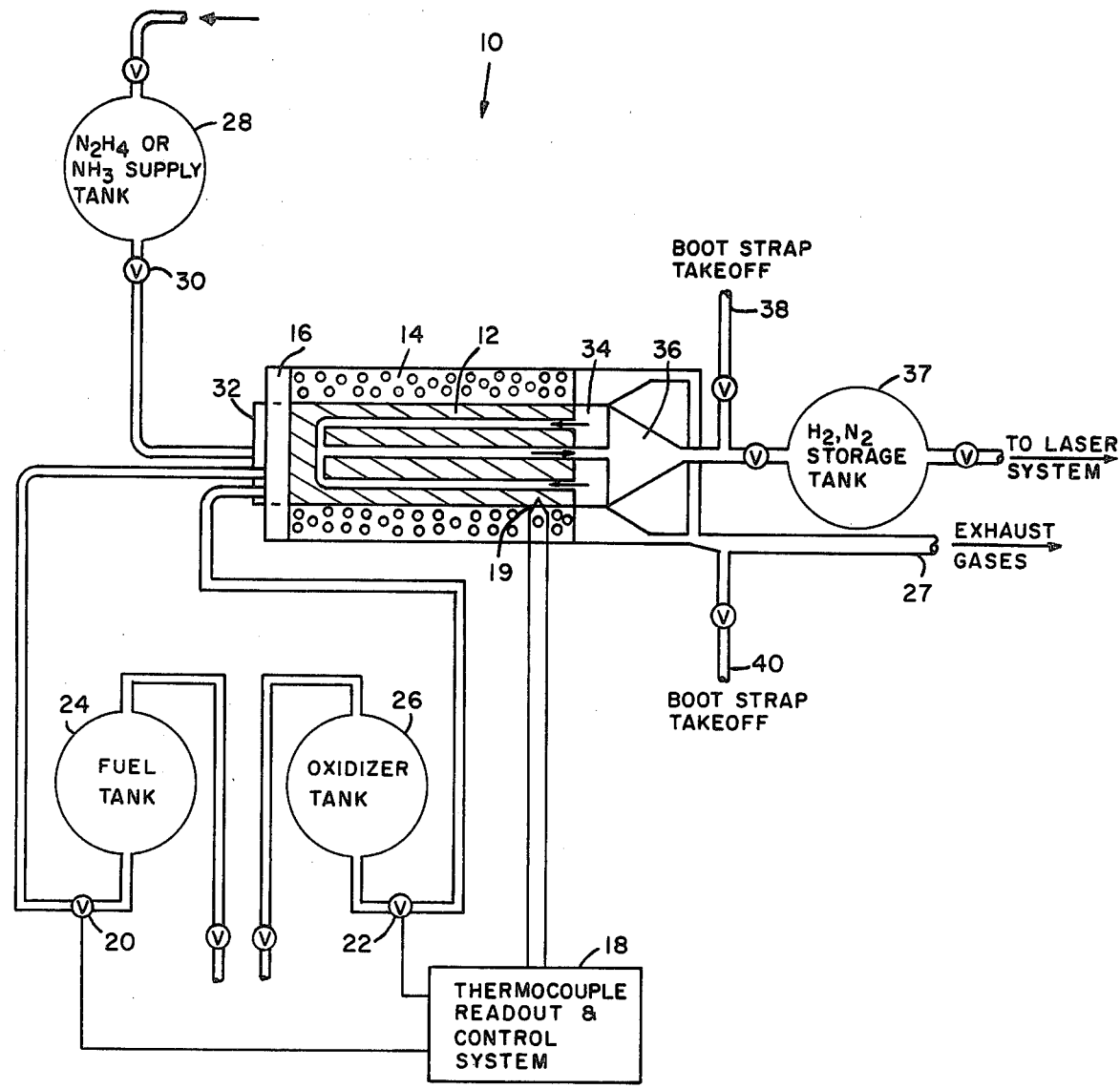

HYDROGEN GAS GENERATOR FROM HYDRAZINE/AMMONIA

DEDICATORY CLAUSE

The invention described herein may be manufactured, used, and licensed by or for the Government for governmental purposes without the payment to us of any royalties thereon.

BACKGROUND OF THE INVENTION

Hydrogen gas has been widely used by industry, space activities, and the military. The desire to produce hydrogen for use to thereby eliminate cumbersome tanks or cryogenic vessels has been investigated.

The on-site generation of $H_2$ to provide a buoyant gas for military balloons, airships, and for raising objects from the ocean floor has been well documented. The on-site generation of $H_2$ from ammonia, $NH_3$, for fuel cells has also been thoroughly investigated and demonstrated.

Hydrazine, $N_2H_4$, and various $N_2H_4$ blends have been used as liquid propellants for gas generators, and this technology has also been thoroughly investigated.

Solid compositions containing hydrogen have been decomposed by a controlled heating method to yield pure hydrogen useful in chemical lasers and as an energy source. For example, U.S. Pat. No. 3,940,474 issued to Chester W. Huskins and Roy E. Patrick is directed to a method of generating hydrogen gas of high purity as required for chemical laser use.

Hydrogen or deuterium gas when employed in a HF or DF laser system generally employs a diluent gas such as helium or nitrogen to adjust either or both the temperature and concentration of the gases, one of which is activated fluorine atoms. Both purity and proper molecular weights of the species of other gaseous products present in the laser system are required to be in the proper range for high laser output and efficiency of operation.

Advantageous would be a method for producing hydrogen or deuterium and a diluent gas from a common source so that high purity, ammonia free hydrogen or deuterium gas and diluent gas could be made available for immediate use in chemical laser operations in large quantities and under high pressure.

Therefore, an object of this invention is to provide a method of producing high purity, ammonia free hydrogen or deuterium gas and a diluent gas, nitrogen, which can be immediately used in a HF or DF laser system.

A further object of this invention is to provide a method for producing hydrogen or deuterium gas as required for mobile fuel cells.

SUMMARY OF THE INVENTION

The method of this invention is for producing high purity, ammonia free hydrogen or deuterium gas and a diluent gas, nitrogen, for immediate use in a laser operation or for use in a fuel cell.

The method of this invention employs a catalyst bed containing alumina pellets on which an active catalyst metal selected from iridium, nickel, niobium, and molybdenium has been deposited. The bed is subsequently degassed for a period of about 20 hours at a temperature of 500° C. in a vacuum of about $10^{-4}$ Torr before its use. This catalyst bed is controlled within the temperature range from about 500° C. to about 900° C. by a hypergolic reaction produced from reacting a fuel selected from the group consisting of hydrazine, methylhydrazine, 1,2-dimethylhydrazine, and blends of the same with an oxidizer selected from the group consisting of inhibited red fuming nitric acid, dinitrogen tetroxide, chlorine trifluoride, and chlorine pentafluoride. This method produces high purity, ammonia free hydrogen or deuterium gas and nitrogen from a decomposition reaction when hydrazine, ammonia, deuterohydrazine, or deuteroammonia is degraded on the catalyst bed in accordance with the following reactions:

(1) $N_2H_4$ 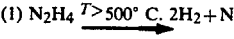 $2H_2 + N_2$;

(2) $NH_3$ 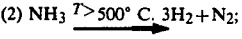 $3H_2 + N_2$;

(3) $N_2D_4$ 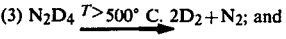 $2D_2 + N_2$; and (4) $ND_3$ 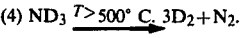 $3D_2 + N_2$.

BRIEF DESCRIPTION OF THE DRAWING

The drawing is a diagrammatic view which depicts a generalized design for $H_2$ and $N_2$ generation based on the catalytic degradation of $N_2H_4$ or $NH_3$. Similarly, the compounds deuterohydrazine or deuteroammonia can be used for generation of $D_2$ and $N_2$.

DESCRIPTION OF THE PREFERRED EMBODIMENT

Hydrazine and ammonia are degraded on a catalyst bed in accordance with equations 1 and 2 below to produce high temperature, high purity, ammonia free hydrogen and nitrogen as required for laser use. Similarly, $N_2D_4$ and $ND_3$ are degraded to produce high temperature, high purity, deuteroammonia free deuterium and nitrogen as required for laser use.

(1) $N_2H_4$ 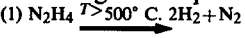 $2H_2 + N_2$ (2) $NH_3$  $3H_2 + N_2$.

The method of this invention employs a catalyst bed containing alumina pellets on which an active catalyst metal selected from iridium, nickel, niobium, and molybdenium has been deposited. In operation, the catalyst bed is controlled within the temperature range from about 500° C. to about 900° C. by a hypergolic reaction produced from reacting a fuel selected from the group consisting of hydrazine, methylhydrazine, 1,2-dimethylhydrazine, and blends of the same with an oxidizer selected from the group consisting of inhibited red fuming nitric acid, dinitrogen tetroxide, chlorine trifluoride, and chlorine pentafluoride. Maintaining the bed between about 500° C. and 900° C. results in complete decomposition of $N_2H_4$ or $NH_3$ into $N_2$ and $H_2$. The products are readily usable in a laser operation requiring high pressure, high temperature hydrogen with a diluent nitrogen. Likewise, the conditions are effective for decomposing the deuterated compounds to produce $D_2$ and $N_2$ for use in a DF laser system. These products can be discharged into a laser operation where the temperature and/or concentration can be adjusted for mixing with F atoms to produce a high powered HF or DF laser which does not encounter a loss of power due to the contaminant ammonia or deuteroammonia. It has been shown that ammonia effects the power output of a DF laser when $NH_3$ is present in $D_2$ by a loss of about 20%–25% for 1% $NH_3$, a loss of about 60% for 4% $NH_3$, and a loss of 65%–70% loss for 6% $NH_3$.

The output from the catalyst bed while the temperature is maintained in the range shown is a mixture of $H_2$ and $N_2$ in a molar ratio of 2 to 1 for each mole of $N_2H_4$ decomposed. When $NH_3$ is decomposed on the catalyst bed maintained in the temperature range, a mixture of 3 moles of hydrogen to 1 mole of nitrogen is obtained for each mole of $NH_3$ decomposed. The deuterated compounds produce like results.

The laser quality hydrogen gas with the diluent nitrogen can be used with activated fluorine atoms produced by a number of established methods in a laser operation to emit laser energy from the compound HF in an excited state. Similarly, the deuterated compounds can be used in a laser operation wherein laser energy is emitted from the compound DF in an excited state.

In further reference to the drawing, the diagrammatic view depicts a generalized design 10 for a temperature controlled catalytic bed 12 for decomposing $N_2H_4$ and/or $NH_3$ to $H_2$ and $N_2$. A ceramic bed (particulate or monolithic) 14 is heated from a hypergolic reaction which takes place within a burner or a fuel/oxidizer reactor zone 16 which includes a fuel/oxidizer manifold and injector which is in communication with the ceramic bed 14 whereby the hot gases from the hypergolic reaction maintains the temperature of the bed between about 500° C. and about 900° C. A thermocouple readout and control system 18 monitors the temperature of bed by means of thermocouple 19 and controls the fuel/oxidizer control vlaves 20 and 22 to supply fuel from fuel supply tank 24 and oxidizer from oxidizer supply tank 26 to effect hypergolic reaction as required to maintain temperature of catalyst bed at desired temperature required to produce ammonia free hydrogen and nitrogen. Exhaust gases from fuel/oxidizer reactor are discharged through a conduit means 27. The $N_2H_4$ or $NH_3$ supply tank 28 furnishes $N_2H_4$ or $NH_3$ through valve 30 to a $N_2H_4$ or $NH_3$ injector and manifold 32 that is in communication with catalyst bed 12 which decomposes $N_2H_4$ and/or $NH_3$ to $H_2$ and $N_2$. Hydrogen/nitrogen effluent from catalyst bed is discharged through a takeoff chamber 34 for recirculation through the catalyst bed and for subsequent discharge through takeoff 36 to $H_2$, $N_2$ storage tank 37 or inline use.

Pressurization of the fuel supply tank 28 can be accomplished by high pressure gas bottle, or by solid gas generator, or by boot strap. Bellows, rolling diaphragm or collapsing diaphragm may be employed to separate $N_2H_4$ or $NH_3$ from pressurant. Similarly, pressurization for hypergolic fuel/oxidizer tanks can be accomplished as described for fuel supply tank. A takeoff for boot strap is shown as 38 and 40 respectively for fuel supply tank and hypergolic fuel/oxidizer supply tanks.

The hypergolic reaction for heating the catalyst bed provides a means for intermittent operation or for continuous operation over an extended period of time as required. Start up time is substantially instantaneous since the hypergolic reaction proceeds at a fast rate with combustion initiation times measurable in milliseconds.

The properties of the fuels and the oxidizers employed in the hypergolic reaction are well documented. The temperatures obtainable from hydrazine, as the representative fuel, and selected oxidizers in predetermined oxidizer-fuel ratios are shown in Table I below. These temperatures provide a preferred temperature range for controlling the catalyst bed for supplying hydrogen and nitrogen for a particular laser operation. Hotter or cooler temperatures can be obtained by selecting different oxidizers for combining in the weight percent oxidizer shown. The difference between the weight percent oxidizer and 100 percent is the weight percent $N_2H_4$ fuel.

TABLE I

Fuel Hydrazine ($N_2H_4$)
Melting point 1.4° C. (34.5° F.)
Boiling point 113.0° C. (235.4° F.)
Vapor pressure at 25° C. (77° F.) = 14.38 mm Hg.

| Oxidizer | Oxidizer, Wt. % | $T_c$, °K. | P(g/cc) |
|---|---|---|---|
| $ClF_3$ | 73 | 3882 | 1.49 |
| $N_2O_4$ | 57 | 3257 | 1.21 |
| IRFNA | 60 | 3003 | 1.28 |

Table II, below, lists the temperatures obtainable from chlorine trifluoride, as the representative oxidizer, and selected fuels in predetermined oxidizer-fuel ratios. These temperatures provide a preferred temperature range for the catalyst bed for supplying deuterium and hydrogen or hydrogen and nitrogen for a particular laser operation.

TABLE II

Oxidizer Chlorine Trifluoride ($ClF_3$)
Melting point, −82.6° C. (−116.7° F.)
Boiling point, 11.3° C. (52.3° F.)

| Fuel | Oxidizer, Wt. % | $T_c$, °K. | P(g/cc) |
|---|---|---|---|
| UDMH | 75 | 3794 | 1.37 |
| $CH_3N_2H_4$ | 74 | 3647 | 1.42 |

Hypergolic reaction temperatures for other combinations of oxidizers and fuels will yield combustion temperatures from a lower range than shown to a higher range than shown in Tables I and II; however, generally speaking a temperature from about 3,000° K. to about 4,000° K. provides sufficient heat for maintaining the operating temperature of the catalyst bed to yield deuterium and nitrogen or hydrogen and nitrogen at a temperature for immediate use. For certain laser operations additional quantities of diluent gas (helium or nitrogen) could be added as required to satisfy the conditions for a particular HF-DF laser operation.

The hydrogen and nitrogen as produced from the decomposition of hydrazine and ammonia is used in a conventional HF chemical laser which uses F atoms as the activated reactants which produces HF and laser energy from the HF. Similarly, the deuterated compounds, deuterohydrazine or deuteroammonia, can be decomposed to yield deuterium and nitrogen for use in a DF laser.

Thus, the basic structure for $H_2$, $N_2$ generation includes a catalyst bed containing a suitable catalyst such as Shell 405, or nickel catalysts, or other commercially available catalysts. The design of the bed, such as the loading of the catalyst and the dimension of the bed will vary according to its projected use.

The structure additionally includes a bed of small ceramic particles or a monolithic structure surrounding the catalyst bed. The purpose of this structure is to maintain the catalyst bed at the desired temperature to insure the complete degradation of $N_2H_4$ to $H_2$ and $N_2$. This ceramic bed is maintained at the proper temperature by passing hot gases through it. The hot gases are generated by the burner 16 which utilizes $N_2H_4$ as fuel and $N_2O_4$, nitrogen tetroxide as oxidizer. Other fuels such as UDMH, unsymmetrical dimethyl hydrazine, or butane, and oxidizers such as IRFNA, inhibited red fuming nitric acid, or chlorine trifluoride, CTF, or $O_2$, can be used. The only purpose of the burner is to furnish hot gases to the ceramic bed. Thus the type of fuel and oxidizer used would depend upon the availability and cost of these items. Exceedingly high temperatures are not constantly required for maintaining the temperature of the ceramic bed since the breakdown of $N_2H_4$ is exothermic and thus will liberate thermal energy as it decomposes.

The temperature of the catalytic bed should be monitored and controlled by the use of a thermocouple readout 18 or other temperature sensing devices and a burner control system. It has been determined that complete degradation of $N_2H_4$ to $H_2$ and $N_2$ takes place between about 500° C. and 900° C.

The $N_2H_4$ tank 28 may be an ordinary tank or it may be pressurized, depending upon the projected need of the $H_2$. Boot strapping is also a process of adjusting the $N_2H_4$ feed pressure.

The $H_2$ storage tank 37, just like the $N_2H_4$ fuel tank, may be of a standard design if the presence of the $N_2$ gas, which is generated along with the $H_2$ gas, does not interfere with the projected use of $H_2$ as a fuel.

One could envision a system, such as the one described, or a modification of it, as furnishing $H_2$ fuel for a moving vehicle. In such a use, the combustion gases could serve, after the initial warm up period of the catalyst bed, as a source of thermal energy for the ceramic bed.

The above system is not only very controllable but also easily modified. Furthermore, the combustion fuels, either $N_2H_4$ or a mixture of $N_2H_4$ and $NH_3$ are of moderate costs.

A scaled-up system similar to the one described could serve as a source for large quantities of $H_2$ for HF lasers of high energy output. Such a system would have the advantage that it does not incur the high-boil-off-rate of cryogenic $H_2$. The corresponding very high explosion and fire hazard associated with cryogenic $H_2$ systems would not be as great a factor for the system of this invention.

We claim:

1. A method of producing ammonia free deuterium and nitrogen or hydrogen and nitrogen at a temperature required for immediate use in a DF or HF laser which uses F atoms as the fuel, said method comprising:
    (i) providing a catalyst bed containing alumina pellets on which an active catalyst metal selected from iridium, nickel, niobium, and molybdenium has been deposited;
    (ii) equiping said catalyst bed with a means for heating and a means for maintaining a temperature between about 500° C. and about 900° C. said means including a hypergolic reaction produced from reacting a fuel selected from the group consisting of hydrazine, methylhydrazine, 1,2-dimethylhydrazine, and blends of the same with an oxidizer selected from the group consisting of inhibited red fuming nitric acid, dinitrogen tetroxide, chlorine trifluoride and chlorine pentafluoride;
    (iii) heating and maintaining said catalyst bed at a temperature between about 500° C. and about 900° C. from said hypergolic reaction to yield a reaction temperature from about 3000° K. and to about 4,000° K. as determined from mixing said selected fuel and said selected oxidizer in a predetermined ratio of oxidizer to fuel from about 57 weight percent to about 75 weight percent oxidizer to about 25 weight percent fuel to about 43 weight percent fuel; and,
    (iv) admitting a compound selected from deuteroammonia, deuterohydrazine, hydrazine, and ammonia to said catalyst bed to effect decomposition to yield a mixture of said deuterium and nitrogen or a mixture of said hydrogen and nitrogen as determined by said compound selected.

2. The method of claim 1 wherein said compound selected and admitted to said catalyst bed to effect decomposition is hydrazine which yields a mixture in ratio of about 2 moles of hydrogen and of about 1 mole of nitrogen.

3. The method of claim 1 wherein said compound selected and admitted to said catalyst bed to effect decomposition is ammonia which yields a mixture in ratio of about 3 moles of hydrogen and of about 1 mole of nitrogen.

4. The method of claim 1 wherein said compound selected and admitted to said catalyst bed to effect decomposition is deuterohydrazine which yields a mixture in ratio of about 2 moles of deuterium and of about 1 mole of nitrogen.

5. The method of claim 1 wherein said compound selected and admitted to said catalyst bed to effect decomposition is deuteroammonia which yields a mixture in ratio of about 3 moles of deuterium and of about 1 mole of nitrogen.

* * * * *